March 16, 1943.       E. D. WILLIAMSON       2,314,260
SIREN
Filed July 2, 1940
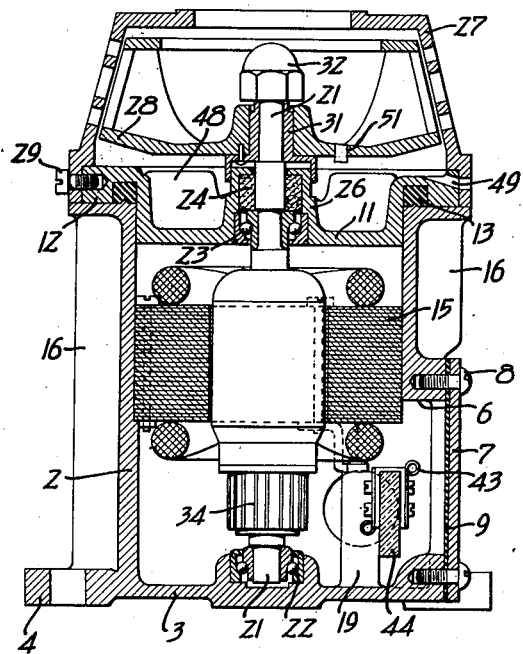
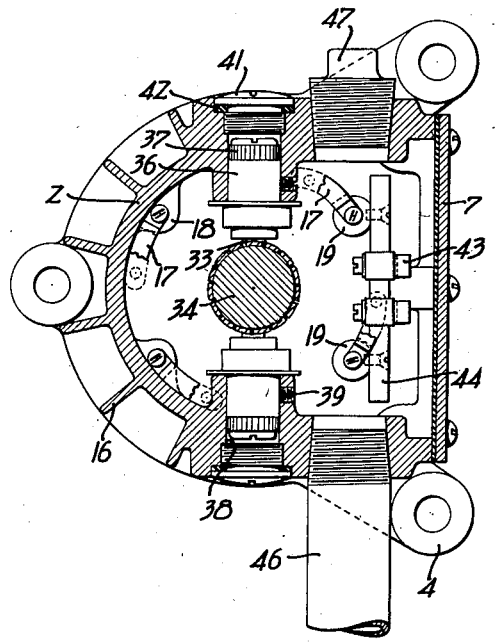
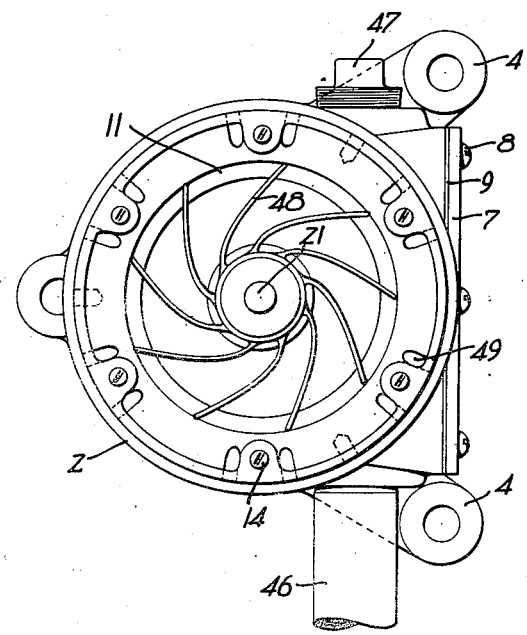
INVENTOR
EVAN D. WILLIAMSON
BY
HIS ATTORNEY Patented Mar. 16, 1943

2,314,260

UNITED STATES PATENT OFFICE 2,314,260

SIREN

Evan D. Williamson, San Francisco, Calif., assignor to E. D. Bullard Company, San Francisco, Calif., a corporation of California Application July 2, 1940, Serial No. 343,573

4 Claims. (Cl. 177—7)

My invention relates to improvements in motor operated devices such as sirens.

It is among the objects of my invention to provide a siren having a motor sealed within a waterproof housing, adapted for use in exposed positions such as on naval vessels.

Another object is to provide a siren of the character described having means for cooling the sealed-in motor, so that the temperature rise is well within the limit specified for naval sirens The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a vertical sectional view of a siren embodying the improvements of my invention; and Figure 2 is a horizontal sectional view of the same taken in a plane through the motor brushes.

Figure 3 is a plan view of the siren housing with the hood and sounding rotor removed to show the end plate.

In terms of broad inclusion, the siren of my invention comprises a motor within a sealed housing, a sounding rotor connected with the motor, and means associated with the housing and the sounding rotor for cooling the motor.

In greater detail, and referring to the drawings, my siren comprises a cylindrical housing 2, preferably of cast aluminum and having a bottom end plate 3 and legs 4 integral therewith. A rectangular opening 6 is cored in the lower side portions of the housing and is covered by a plate 7 secured by screws 8 and sealed with a gasket 9. The upper end of the housing is sealed by a cupped plate 11 having a flange 12 clamped down against a gasket 13 by screws 14.

The motor for the siren is mounted directly within housing 2 so that the latter forms the motor casing, and field core 15 is sized to fit snugly against the inner surface of the housing to provide a heat conducting path directly through the wall to the exterior of the housing. Cooling fins 16 disposed about the housing serve to radiate this outwardly conducted heat. The field core is further held by brackets 17 secured to lugs 18 and posts 19. Armature shaft 21 is journaled at bottom plate 3 in bearing 22 and at top plate 11 in bearing 23, the upper end of the shaft projecting through the latter plate and sealed by a gland 24 disposed in a neck 26 of the end plate.

A hood 27, open at the top and ported at the side, forms the casing for sounding rotor 28 which is disposed exteriorly of motor housing 2 and is mounted on the projecting end of motor shaft 21. The hood is secured to the housing by screws 29 threaded into plate flange 12. Sounding rotor 28 is pinned to a flange of sleeve 31 which in turn is clamped to the motor shaft by a cap nut 32 threaded on a split end of the sleeve.

Brushes 33 for motor commutator 34 are mounted in suitable holders 36 having adjusting screws 37, all seated within bores 38 of the housing and secured by screws 39. Brush receiving bores 38 are sealed by cap screws 41 bearing against packing washers 42. Motor terminals 43 are also disposed within the housing on a block 44 secured to post 19. External leads to these terminals are brought through a conduit 46 threadable into a tapped hole at either side of the housing; the tapped hole not used being closed by a plug 47. Connections at the terminal block are readily made by removing cover plate 7.

By the siren construction above described it is seen that motor housing 2 is completely sealed against the entrance of water, to protect the motor from moisture, which is a rigid requirement of navy sirens. This sealing in of the motor however eliminates all ventilation and introduces a difficult problem of properly cooling the motor. The cooling problem in my siren is partially solved by the thermal contact between core 15 and finned housing 2. As a further means of cooling the motor I provide radially extending arcuate fins 48 on the upper surface of end plate 11 underlying rotor 28. Ventilating openings 49 formed in flange 12 and ported out through the rim of hood 27 are provided about the upper peripheral portion of end plate 11 adjacent fins 48.

When the siren is operating to spin rotor 28 the lower surface of the latter creates a circular movement of air in the space between plate 11 and the rotor. This moving air is deflected outwardly through openings 49 by fins 48, thus providing a blower action. If desired, air inlets 51 indicated by dotted lines in Figure 1 may be provided in the rotor, but these are usually not necessary because of the peripheral clearance between the rotor and hood 27, through which air is drawn for the blower. Heat rising from the motor is thus conducted through plate 11, radiated from fins 48, and quickly dissipated by the blower action.

The combined cooling features of my invention for a sealed-in motor effectively dissipate the heat and my siren operates with a temperature rise of about 35° while other sirens of this kind find difficulty in keeping within the 45° limit specified for navy sirens.

While the motor housing is normally sealed, the motor parts requiring attention or adjustment may readily be reached. Thus the brushes may be adjusted by removing closure screws 41; and the commutator may be sanded by removing cover plate 7. When the unit is assembled the packing of gland 24 is saturated with pump grease for a water seal; and bearings 22 and 23 are filled with high temperature grease for lubrication.

I claim:

1. A siren comprising a housing having a wall, a motor in the housing and having a shaft projecting through said wall, a sounding rotor on the projecting end of the shaft, a ported stator disposed about the rotor, an inlet passage through the rotor for admitting air to the backside thereof, cooling fins on said wall and arranged to direct an outward movement of air initiated by the rotor, and an outlet for discharging air from the backside of the rotor.

2. A siren comprising a housing having a wall, a motor in the housing and having a shaft projecting through said wall, a sounding rotor on the projecting end of the shaft, a ported stator disposed about the rotor, an inlet passage through the rotor for admitting air to the backside thereof, cooling fins on said wall and arranged to direct an outward movement of air initiated by the rotor, and an outlet for discharging air from the backside of the rotor, said rotor having a substantially smooth back surface.

3. A siren comprising a housing having an upper wall, a motor in the housing and having a vertical shaft projecting through said wall, a sounding rotor on the projecting end of the shaft, a ported stator disposed about the rotor, an inlet passage through the rotor for admitting air to the underside thereof, cooling fins on the upperside of said wall and arranged to direct an outward movement of air initiated by the rotor, and an outlet for discharging air from the underside of the rotor.

4. A siren comprising a housing having a wall, a motor in the housing and having a shaft projecting through said wall, a sounding rotor on the projecting end of the shaft, a ported stator disposed about the rotor, an inlet passage through the rotor for admitting air to the backside thereof, said wall having a recess facing the rotor, cooling fins in the recess and arranged to direct an outward movement of air initiated by the rotor, and an outlet for discharging air from the backside of the rotor.

EVAN D. WILLIAMSON.